United States Patent [19]

Baek

[11] Patent Number: 5,604,543
[45] Date of Patent: Feb. 18, 1997

[54] DEVICE AND METHOD FOR AUTOMATIC CHANNEL MEMORY UTILIZING PICTURES OUT PICTURE

[75] Inventor: Woon G. Baek, Seoul, Rep. of Korea

[73] Assignee: Gold Star Co., Ltd., Seoul, Rep. of Korea

[21] Appl. No.: 496,901

[22] Filed: Jun. 29, 1995

Related U.S. Application Data

[63] Continuation of Ser. No. 172,303, Dec. 23, 1993, abandoned.

[30]  Foreign Application Priority Data

Dec. 23, 1992 [KR]  Rep. of Korea ................ 1992-25162

[51] Int. Cl.$^6$ ................................................ H04N 5/45
[52] U.S. Cl. .......................... 348/564; 348/732; 348/731
[58] Field of Search ..................... 348/565, 567, 348/569, 570, 588, 731, 732, 564; 455/150.1, 158.1, 158.2, 158.3, 160.1, 179.1, 182.2, 184.1, 185.1, 186.1; H04N 5/45, 5/50, 5/445

[56]  References Cited

U.S. PATENT DOCUMENTS

| | | | |
|---|---|---|---|
| 4,855,833 | 9/1989 | Kageyama et al. ...................... | 348/565 |
| 5,045,946 | 9/1991 | Yu ........................................... | 348/565 |
| 5,130,800 | 7/1992 | Johnson et al. ......................... | 358/183 |
| 5,144,438 | 9/1992 | Kim ........................................ | 348/565 |
| 5,247,365 | 9/1993 | Hakamada et al. ..................... | 348/732 |
| 5,420,642 | 5/1995 | Baek ....................................... | 348/565 |

*Primary Examiner*—John K. Peng
*Assistant Examiner*—Nathan J. Flynn
*Attorney, Agent, or Firm*—Spencer & Frank

[57]  ABSTRACT

This invention relates to a device for automatic channel memory which comprises a first synchronization part for tuning channels displayed on a POP frame, a second synchronization part for tuning channels displayed on a main frame, a first intermediate frequency processing part for processing intermediate frequencies of the broadcasting signals of a synchronized channel by the first synchronization part, a second intermediate frequency processing part for processing intermediate frequencies of the broadcasting signals of the synchronized channel by the second synchronization part, a microcomputer for generating control signals in response to a key signal, an OSD processing part for generating required OSD signals in response to the control signals of the microcomputer, a switching part for selecting the signals from the first and the second intermediate frequency processing parts and external signals in response to the control signal of the microcomputer, a chroma part for processing the chrominance signal of a first signal selected by the switching part and of the OSD signals generated in the OSD processing part, and a POP processing part for processing a second signal selected by the switching part to be displayed onto the POP frame.

6 Claims, 3 Drawing Sheets

DEVICE AND METHOD FOR AUTOMATIC CHANNEL MEMORY UTILIZING PICTURES OUT PICTURE

This is a continuation of application Ser. No. 08/172,303, filed on 23 Dec. 1993 now abandoned.

FIELD OF THE INVENTION

This invention relates to a television containing pictures of picture (herein after called POP), more particularly to a device and method for automatic channel memory which can search for broadcasting channels and store the channel numbers utilizing POP while watching a present selected channel.

BACKGROUND OF THE INVENTION

Picture reception systems such as TV and VCR, in general, have a device for automatic channel memory or manual channel memory.

The device for automatic channel memory searches all channels and memorize those channel numbers which have an input of a broadcasting signal, ie., when a user presses the automatic channel memory key, the channel numbers goes up and down automatically picking up only those channels which had been memorized in the device to memorize those signals having a broad casting signal.

However, when used while watching the television, such a device for automatic channel memory puts, being synchronized with those channels one by one not only those channels having a broadcasting signal, but also even those channels having no broadcasting signal, on the frames.

By the consequence, there has been problem in the automatic memory of channels because even those noise pictures and noise voices from those channels having no broadcasting signal happen to come on interfering watching of the television.

On the other hand, the device for manual channel memory memorizes or erases channel numbers into/from the memory by manual operation of an add key or an erase key after selection of a channel by pressing a channel control key.

However, the trend of current development puts its emphasis on the device for automatic channel memory rather than on the device for manual channel memory because of the inconvenience of pressing of the keys of the device for manual channel memory.

SUMMARY OF THE INVENTION

The object of this invention is to provide method for automatic channel memory which can search and store broadcasting channels automatically without interfering with watching a television.

Another object of this invention is to provide a device for automatic channel memory which can search and store broadcasting channels automatically without interfering with watching a television.

These and other objects and the features of this invention can be achieved by providing a device for automatic channel memory utilizing pictures out picture including a synchronization part for synchronizing to signals received through an antenna, an intermediate frequency processing part for processing the intermediate frequencies of the synchronized signals of the synchronization part, a microcomputer for generating control signals in response to the automatic channel memory key signal, a switching part for selecting one signal of the signals form the intermediate frequency processing part in response to a first control signal of the microcomputer, an on screen display (OSD) processing part for generating OSD signal in connection with the automatic channel memory in response to a second control signal of the microcomputer, a chroma part for processing chrominance signals of the OSD signal and a first selection signal of the switching part, a POP frame processing part for processing a second selection signal of the switching part to be displayed onto a POP frame, and a POP utilizing automatic channel memory including picture size conversion part for converting picture size in response to a third control signal of the microcomputer so as to display the signals from the chroma part and the POP frame processing part onto a CRT, and by providing a method for POP utilizing automatic channel memory including steps of entering into a POP mode in automatic channel memory mode, searching channels having broadcasting signals one by one, memorizing the searched channel numbers and displaying the broadcasting signals of the searched channels onto the POP frame, and canceling the automatic channel memory mode and the POP mode if the channel numbers to be memorized has already been memorized.

DETAILED DESCRIPTION OF THE INVENTION

Figure 1:
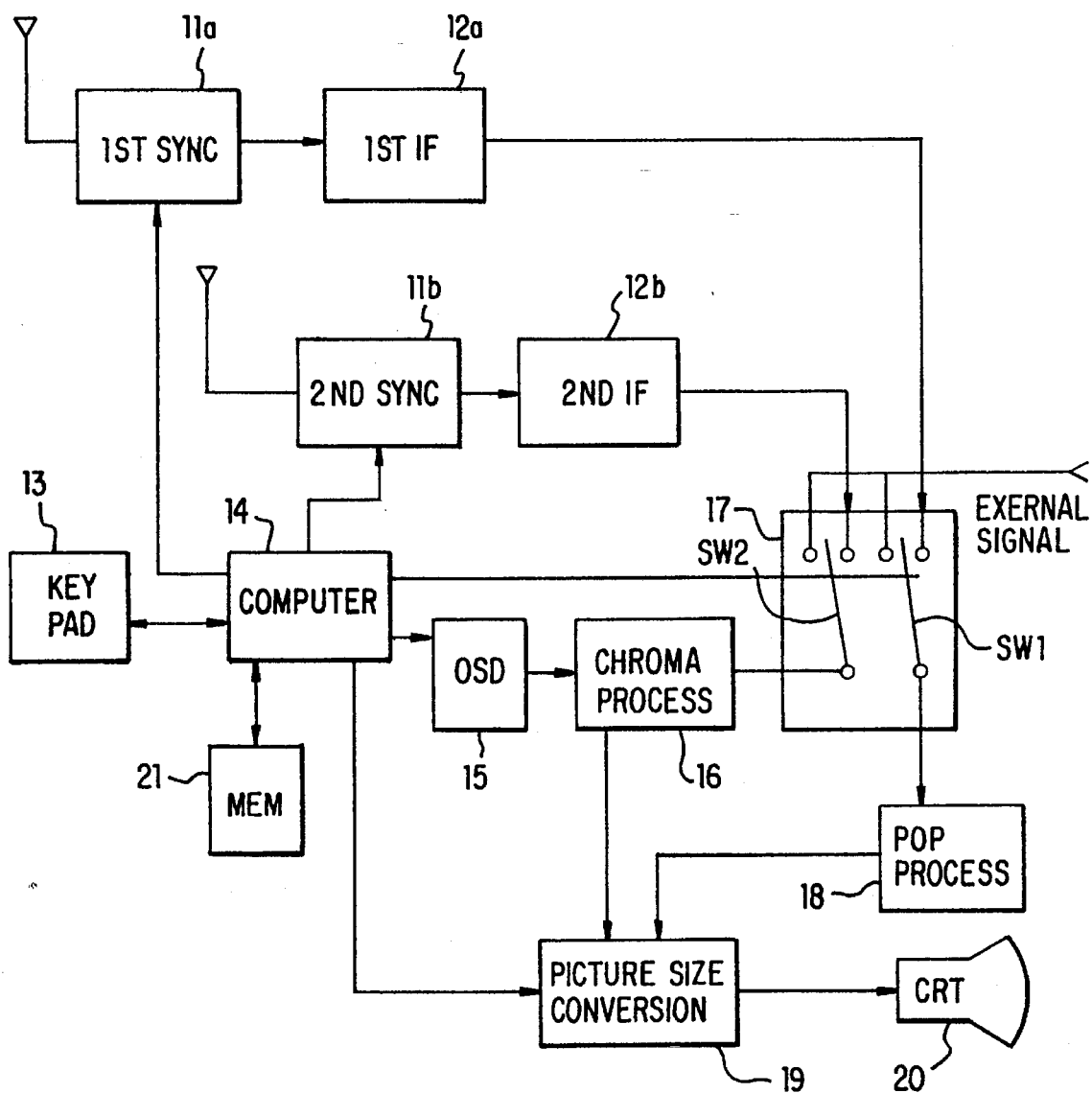
FIG. 1 is a block diagram showing a POP utilizing automatic channel memory in accordance with this invention.

Shown in FIG. 1 is a block diagram of a POP utilizing automatic channel memory in accordance with this invention, including a first synchronization part 11a for tuning channels displayed on a POP frame, a second synchronization part 11b for tuning channels displayed on a main frame, a first intermediate frequency processing part 12a for processing intermediate frequencies of the broadcasting signals of a synchronized channel by the first synchronization part 11a, a second intermediate frequency processing part 12b for processing intermediate frequencies of the broadcasting signals of the synchronized channel by the second synchronization part 11b, a key pad, microcomputer 14 for generating control signals in response to the key signals of the key pad 13, an OSD processing part 15 for generating required OSD signals in response to the control signals of the microcomputer 14, a switching part 17 for selecting the signals from the first and the second intermediate frequency processing part 12a and 12b and external signals in response to the control signal of the microcomputer, a chroma part 16 for processing the chrominance signals of the signals selected by the switching part 17 and of the OSD signals generated in the OSD processing part 15, a POP processing part 18 for processing the signals selected by the switching part to be displayed onto the POP frame, and a picture size conversion part 19 for converting picture size so as to display the signals from the chroma part 16 and the POP processing part 18 onto a CRT 20 in response to the control signals from the microcomputer. The unexplained number 21 is an outside memory, and SW1 and SW2 are switches, respectively.

The broadcasting signals of the channel synchronized in the second synchronization part 11b are processed of the intermediate frequencies in the second intermediate frequency processing part 12b and applied to a terminal of the switch SW2 of the switching part 17. The broadcasting signals of the second synchronization part 11b selected by the control signal of the microcomputer 14. together with the OSD signals generated in the OSD processing part are applied to the chroma part 16 to be processed of chrominance signals, and the signals from the chroma part 16 are applied onto the CRT 20 through the picture size conversion part 19 thus, the broadcasting signals of the channel synchronized in the second synchronization part 11b can be watched on the main frame.

When a user presses the automatic channel memory key on the pad 13 to memorize the channel automatically during watching a TV, the microcomputer, on sensing it, stores the channel number of the present channel displayed on the main frame into the memory part 21 and carries out tuning of the first synchronization part 11a.

The signals of the tuned channel are processed of intermediate frequencies in the first intermediate frequency processing part 12a and applied to the POP processing part 18 through the switching part 17. The POP processing part 18 processes the applied broadcasting signals so as to be displayed on three POP frames 23 shown in FIG. 2 and transmits it to the CRT 20 through the picture size conversion part 19. Of the three POP frames 23 one frame shows the moving picture of the tuned channel, and the rest two frames show the still pictures of the channel tuned previously.

Figure 3:
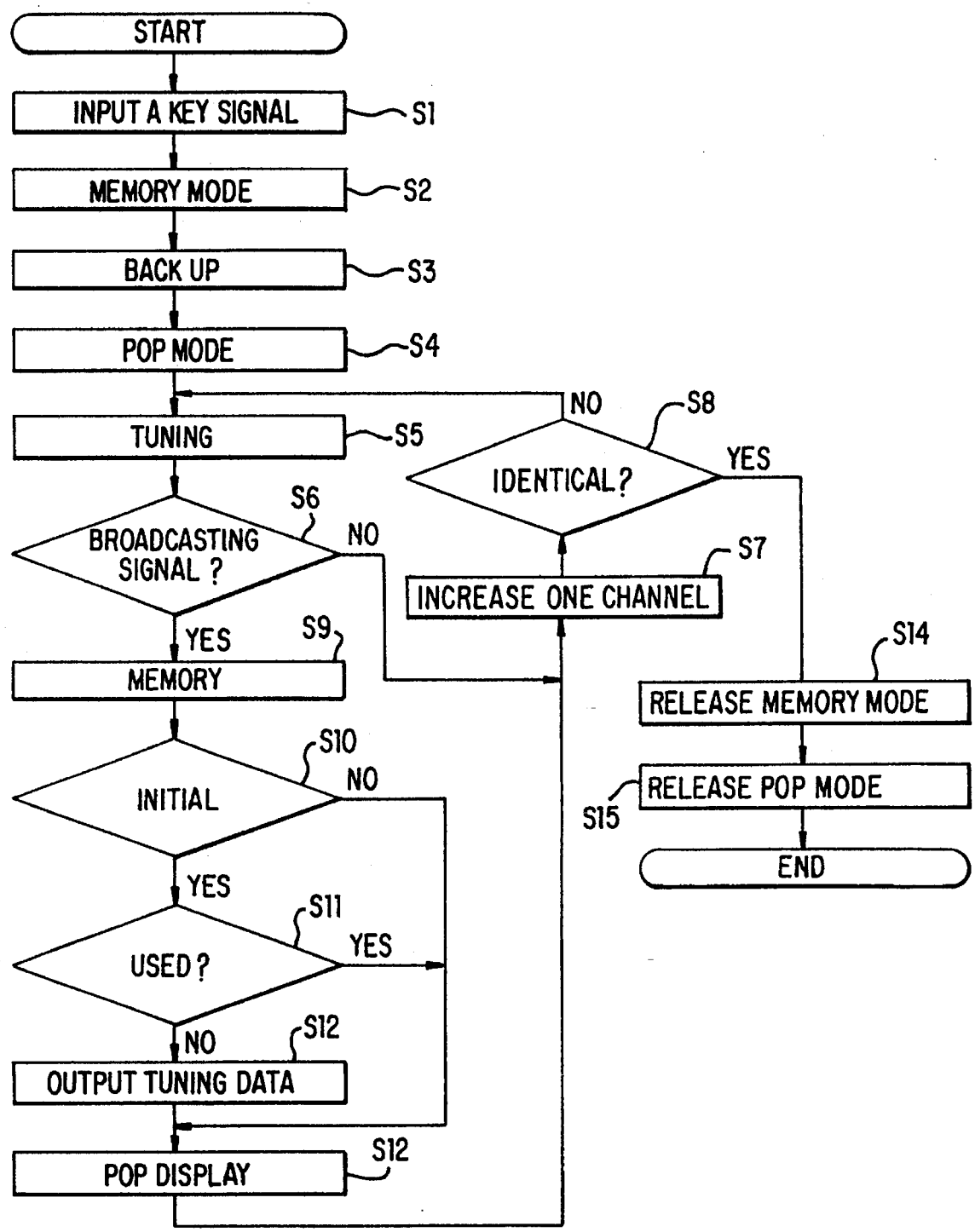
FIG. 3 is a flow chart explaining the operation of FIG. 1.

A method for POP utilizing automatic channel memory according to this invention is to be explained hereinafter, referring to FIG. 3.

When there is an automatic memory key signal input(step S1), the microcomputer enters into an automatic channel memory mode, backs up the channel number of the main frame watching presently, and enters into a POP mode(steps S2 to S4), taking the channel number of the backed up main frame as a datum point, tunes the channel to a first synchronization part 11a(step S5), when found no broadcasting signals in the channel on checking the channel of a broadcasting signal(step S6), increases the channel number by one(step S7), and checks if the channel number of the increased channel is identical with the channel number of the backed up main frame(step S8). When identical, indicating that searching of all channels has been completed, releases the automatic channel memory mode and the POP mode(steps S14 and S15), when not identical, returns to the channel tuning step S5, on the other hand, when found a broadcasting signal in the channel, memorizes the channel number(step S9) and checks if it is an initial memory(step S10), if it is a channel number of initial memory, checks if the main frame is in use(step S11), that is, checks if any broadcasting signals were in the channel of the backed up main frame or picture signals of a video cassette recorder or a cable TV are on display, if the main frame is not in use, transmits the tuning data to the second synchronization part 11b(step S12) to enable to display the broadcasting signal of the channel of the initial memory, after displaying the memorized channel onto the POP frame(step S13) returns to the step of increasing the channel number by one(step S7).

Figure 2:
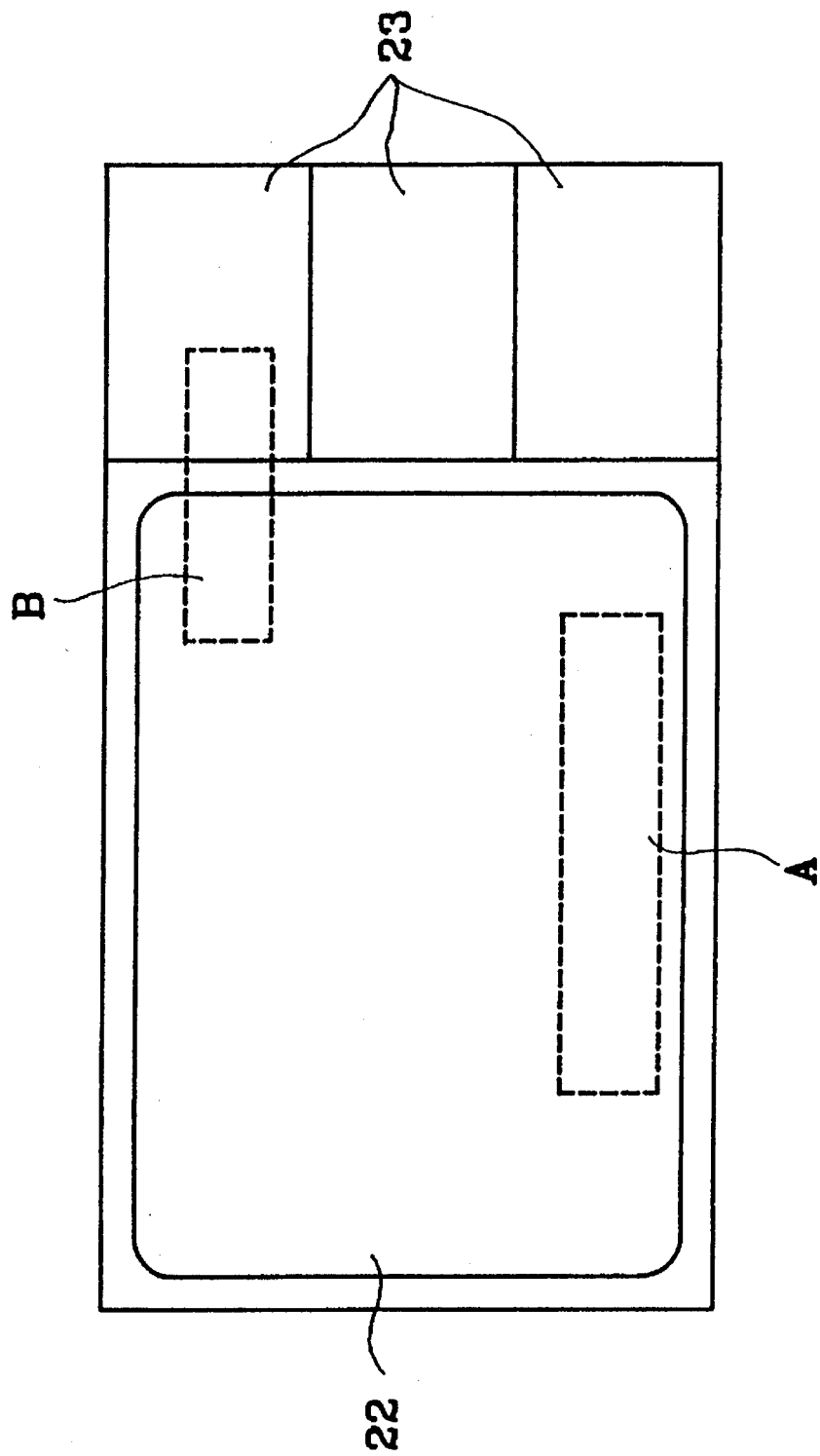
FIG. 2 shows a CRT frame of FIG. 1.

In displaying on the POP frame, the broadcasting signal of the initial memory is displayed in moving pictures on the first frame of the POP frame 23 in FIG. 2, and when found a channel having broadcasting signals in the channel searching operation, the display on the first frame is altered into a still picture and the broadcasting signal of the found channel is displayed in moving picture on the second frame of the POP frame 23.

When found another channel having broadcasting signal thereafter, the moving picture on the second frame is altered into a still picture, and the broadcasting signal of the another found channel is displayed in moving picture on the third frame of the POP frame 23. Thereafter, the channel of the broadcasting signal is displayed repeating above display process.

According to this invention as explained hereinbefore, a desired broadcasting can be watched on a noiseless main frame by handling the broadcasting signals of the channel selected in the automatic channel memory mode.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A device for automatic channel memory, comprising:

a first synchronization part for tuning channels to a broadcasting signal for display on a plurality of POP frames;

a second synchronization part for tuning channels to another broadcasting signal for display on a main frame;

a first intermediate frequency processing part for processing intermediate frequencies of the broadcasting signals of synchronized channels by the first synchronization part;

a second intermediate frequency processing part for processing intermediate frequencies of the broadcasting signals of the synchronized channel by the second synchronization part;

a microcomputer for generating first, second and third control signals in response to a key signal;

an OSD processing part for generating required OSD signals in response to the first control signal of the microcomputer;

an external signal source;

a switching part connected to outputs of (1) the first and the second intermediate frequency processing parts, (2) the external signal source and (3) the microcomputer for selecting the signals from the first and the second intermediate frequency processing parts as respectively first and second signal outputs from the switching part, or from the external signal source as a third signal output from the switching part, the switching part being operated in response to the second control signal of the microcomputer;

a chroma part interconnecting the second output of the switching part, and an output of the OSD processing part for processing a chrominance signal of the second signal selected by the switching part and of the OSD signals generated in the OSD processing part;

a POP processing part connected to the first output of the switching part for processing the first signal selected by the switching part to be displayed onto one of the POP frames; and a picture size conversion part connected to respective signal outputs of the chroma part, the POP processing part and the microcomputer for converting picture size so as to display the signals from the chroma part and the POP processing part onto a CRT in response to the third control signal from the microcomputer; and said microcomputer comprising:

means for entering into an automatic channel memory mode;

means for entering into a POP mode;

means for backing up the channel number of the signal being displayed on the main frame;

means for tuning the first synchronization part for channels to be displayed on the POP frames, and memorizing the channel of a broadcasting signal;

means for (a) displaying the broadcasting signal of an initial memory in moving pictures on one frame of the POP frames, (b) altering the display on the one POP frame into a still picture when a second channel having a broadcasting signal is found by the means for tuning the first synchronization part, (c) displaying the broadcasting signal of the second channel in moving pictures on a second POP frame, and (d) altering the display on the second POP frame into a still picture when a third channel having a broadcasting signal is found by the means for tuning the first synchronization part, (e) displaying the broadcasting signal of the third channel in moving pictures on a third POP frame and repeating the displaying and altering functions until all channels are searched, searching being completed when the number of the next channel to be displayed corresponds to the backed up channel number of the signal being displayed on the main frame; and means for releasing the automatic channel memory mode and the POP mode when searching of all channels has been completed.

2. The device of claim 1 wherein said microcomputer further comprises means for checking if the main frame is not in use and displaying the broadcasting signal to the main frame.

3. The device of claim 1 wherein the external signal source is a video cassette recorder.

4. The device of claim 1 wherein the external signal source is a cable television.

5. A method of using an automatic channel memory device of claim 1, comprising the steps of:

(a) imputing an automatic memory key signal (step S1), (b) entering into an automatic channel memory mode, backing up the channel number of the main frame being watched, and entering into a POP mode (steps S2 to S4), (c) taking the channel number of the backed up main frame as a datum point, and tuning the channels in POP mode in a first synchronization part (step S5), (d) when no broadcasting signal is found in a checked channel (step S6), increasing the channel number by one (step S7), and determining if the channel number of the increased channel is identical to the channel number of the backed up main frame (Step S8), (e) when one of the increased channels is identical to the channel number of the backed up main frame to indicate that searching of all channels has been completed, releasing the automatic channel memory mode and the POP mode (steps S14 and S15), (f) when not identical, returning to the channel tuning (step S5), (g) when a broadcasting signal is found in the channel, memorizing the channel number (step S9) and checking to determine if it is an initial memory (step 10), (h) if it is a channel number or initial memory, checking if the main frame is in use (step S11) by determining if any broadcasting signals are in the channel of the backed up main frame on display, (i) if the main frame is not in use, transmitting the tuning data to a second synchronization part (step S12) to enable to display the broadcasting signal of the channel of the initial memory, and (j) after displaying the memorized channel onto the POP frame (step S13) returning to the step of increasing the channel number by one (step S7), wherein the broadcasting signal of an initial memory is displayed in moving pictures on one frame of a plurality of POP frames, and the display on the one frame is altered into a still picture when a second channel having a broadcasting signal is found during POP tuning operation, and the broadcasting signal of the second channel is displayed in moving pictures on a second frame of the POP frames, and the automatic channel memory mode and the POP mode are released when searching of all channels has been completed.

6. A method of automatic channel memory, comprising the steps of:

tuning channels to a broadcasting signal for display on a plurality of POP frames with a first synchronization part;

tuning channels to another broadcasting signal for display on a main frame with a second synchronization part;

processing intermediate frequencies of the broadcasting signals of the channels synchronized by the first synchronization part with a first intermediate frequency processing part;

processing intermediate frequencies of the broadcasting signals of the channel synchronized by the second synchronization part with a second intermediate frequency processing part;

generating first, second and third control signals in response to a key signal with a microcomputer;

generating required OSD signals in response to the first control signal of the microcomputer with an OSD processing part;

selecting the signals from the first and the second intermediate frequency processing parts as respective first and second signal outputs from a switching part, or from an external signal source as a third signal output from the switching part, the switching part being operated in response to the second control signal of the microcomputer with the switching part being connected to outputs of (1) the first and the second intermediate frequency processing parts, (2) the external signal source and (3) the microcomputer;

processing a chrominance signal of the second signal selected by the switching part from the second intermediate frequency processing port and of the OSD signals generated in the OSD processing part with a chroma part interconnecting a second output of the switching part and an output of the OSD processing part;

processing a first signal selected by the switching part to be displayed onto one of the POP frames with a POP processing part connected to a first output of the switching part;

converting picture size so as to display the signals from the chroma part and the POP processing part onto a CRT in response to the third control signal from the microcomputer with a picture size conversion part connected to respective signal outputs of the chroma part, the POP processing part and the microcomputer; and with a microcomputer:
(a) entering into an automatic channel memory mode;
(b) entering into a POP mode;
(c) backing up the channel number of the signal being displayed on the main frame;
(d) tuning the first synchronization part for channels to be displayed on the POP frames, and memorizing the channel of a broadcasting signal;
(e) displaying the broadcasting signal of an initial memory in moving pictures on one frame of the POP frames;
(f) altering the display on the one POP frame into a still picture when a second channel having a broadcasting signal is found by the means for tuning the first synchronization part;
(g) displaying the broadcasting signal of the second channel in moving pictures on a second POP frame;
(h) altering the display on the second POP frame into a still picture when a third channel having a broadcasting signal is found by the means for tuning the first synchronization part;
(i) displaying the broadcasting signal of the third channel in moving pictures on a third POP frame and repeating the displaying and altering functions until all channels are searched, searching being completed when the number of the next channel to be displayed corresponds to the backed up channel number of the signal being displayed on the main frame; and
(j) releasing the automatic channel memory mode and the POP. mode when searching of all channels has been completed.

* * * * *